United States Patent [19]

McFall

[11] 3,967,840

[45] July 6, 1976

[54] JOINT AND PROCESS FOR FORMING SAME

[75] Inventor: Robert A. McFall, East Peoria, Ill.

[73] Assignee: Caterpillar Tractor Co., Peoria, Ill.

[22] Filed: Mar. 13, 1975

[21] Appl. No.: 558,197

[52] U.S. Cl. .................................. 285/222; 29/458; 29/523; 285/382.4; 403/404; 285/405
[51] Int. Cl.² ........................................ F16L 41/00
[58] Field of Search ..................... 29/458, 459, 523; 285/55, 382.4, 382.5, 382, 222 X, 404 X, 405 X; 403/274, 277, 285

[56] References Cited
UNITED STATES PATENTS

| | | | |
|---|---|---|---|
| 1,348,667 | 8/1920 | Snyder | 29/459 UX |
| 1,988,418 | 1/1935 | German | 285/382.4 X |
| 2,329,653 | 9/1943 | Rogoff | 29/459 UX |
| 2,685,461 | 8/1954 | Mueller | 29/523 X |
| 3,188,733 | 6/1965 | Rickard | 29/523 |
| R21,903 | 9/1941 | Brenneisen | 29/459 X |

*Primary Examiner*—Charlie T. Moon
*Attorney, Agent, or Firm*—Phillips, Moore, Weissenberger Lempio & Strabala

[57] ABSTRACT

The invention is concerned with an improvement in a process for forming a tubing-machined metallic member joint and with said joint, the process comprising providing a metallic member of substantially full theoretical density having a portion thereof adapted to matingly receive a metallic tube, placing one end of said tube against the mating portion of said member, said tube being formulated of a less hard metal than said member, and urging said one end of said tube against said mating portion of said member thereby forming said joint. The improvement comprises an increase in the torque strength of said joint attained by contacting said member, prior to the placing the one end of said tube in mating contact with the mating portion of said member, with steam at a temperature and for a time sufficient to form a thin hard metal oxide on said mating portion and cooling the member after completion of the contacting and prior to placing said tube in mating contact with said mating portion. The resulting tubing-member joint has a far greater resistance to torque than do the tubing-member joints of the prior art.

9 Claims, 2 Drawing Figures

U.S. Patent   July 6, 1976   3,967,840
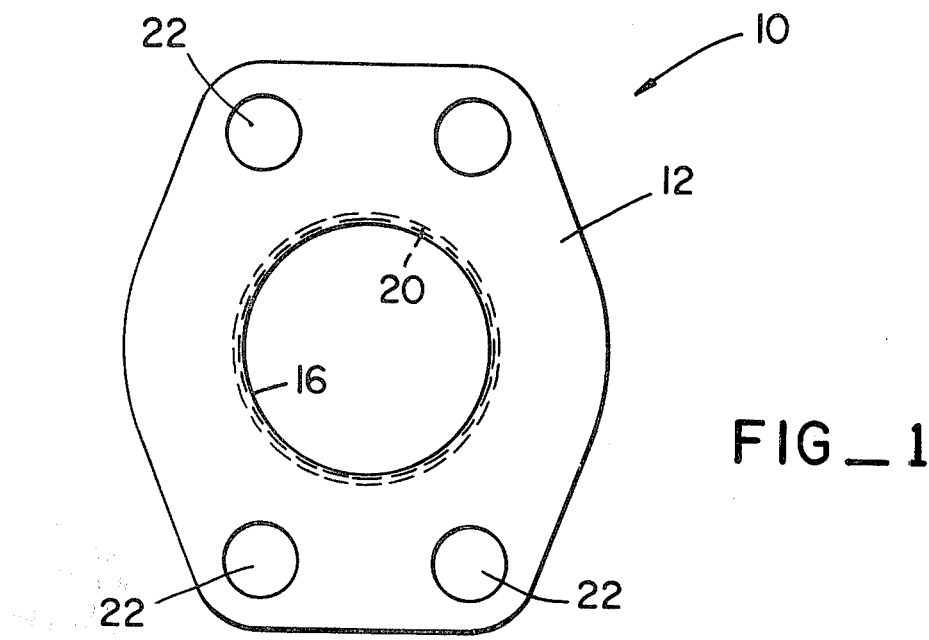
FIG_1
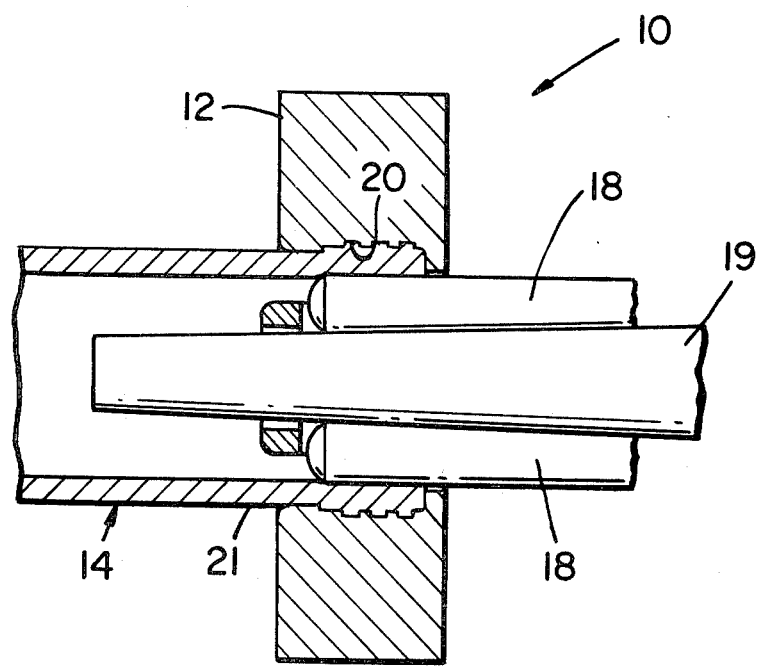
FIG_2

JOINT AND PROCESS FOR FORMING SAME

BACKGROUND OF THE INVENTION

1. Field of the Invention

The invention is concerned with joints formed between tubing and metallic members made of machined metal of substantially full density such as flanges and more particularly is concerned with joints of increased torque resistance between tubing and metallic members and with a unique and novel process for producing such an improved torque resistant joint.

2. Prior Art

The prior art teaches any number of tubing-flange joints. A number of such joints are obtainable wherein the flange has a circular cross section hole therethrough adapted to receive an end of the tube, the hole having at least one annular channel extending therefrom into the flange, by placing an end of the tube within the hole, the end having an external diameter very nearly equal to the diameter of the hole and the tube being formulated of a less hard metal than the flange, and forcing an expanding means into the end of the tube and thereby forming a force-fit joint between the exterior of the tube and the hole through the flange. Other joints have been made by flaring tube ends and clamping, bolting or otherwise pressing a mating portion of a metallic member thereagainst.

Generally the prior art flanges have been formulated by machining from metal of a desired hardness, for example, of hardness Rockwell B90 (Hardness as referred to herein is as measured by ASTM E 18). Such joints occasionally have developed leaks due to lack of a sufficient resistance of the joint to torque which is encountered in many every day operations using said joints. For example, when said joints are part of the hydraulic system of heavy earth moving equipment they are often subjected to sharp torque strains which cause the joints to break loose thus leading to leaking about the joints.

In the past it has been standard practice to clean metal oxide coatings which may have been formed on the tubing mating portion of the metallic member off of said mating portion in the belief that a stronger more torque resistant and more leak proof joint would thereby result. This has been particularly true with iron based alloys to insure the removal of rust ($Fe_2O_3$).

The present invention provides an improved tube-machined metallic member joint of significantly higher resistance to torque than prior art joints through a relatively inexpensive treatment of the metallic member part of the joint prior to the formation of the joint. Surprisingly, while the treatment does not cause any measurable change in hardness of the machined metallic members, it still leads to joints of significantly increased torque resistance. Also provided by the present invention is a process for forming a more torque resistant joint through a specific treatment of the machined metallic member portion thereof prior to the formation of the joint.

SUMMARY OF THE INVENTION

Briefly, in one sense the invention comprises an improvement in a process for forming a tubing-machined metallic member joint comprising providing a metallic member of substantially full theoretical density having a portion thereof adapted to matingly receive a metallic tube, placing one end of said tube against said mating portion, said tube being formulated of a less hard metal than said member, and urging said one end of said tube against said mating portion thereby forming said joint. The improvement comprises controllably oxidizing the member at an elevated temperature, prior to the placing of the tube in mating contact with said mating portion, to form a thin adherent hard metal oxide layer on said mating portion and cooling the member after completion of the oxidizing.

In another sense, the invention comprises a joint formulated by the improved process of the invention.

BRIEF DESCRIPTION OF THE DRAWINGS

The invention will be better understood by reference to the drawings in the figures of which like numbers denote like parts throughout and wherein:

FIG. 1 illustrates an end view of a flange; and

FIG. 2 illustrates in side elevation view in partial section a joint in accordance with the present invention.

DETAILED DESCRIPTION OF THE PREFERRED EMBODIMENT

A joint produced in accordance with the present invention is indicated generally by the numeral 10. The joint is formed between the flange 12 and the tube 14 with the tube 14 being placed within a circular cross section hole 16 which passes through the flange 12 and then being expanded as by driving an expanding means such as the floating or caged roller 18 into the end of the tube 14 which is within the flange by driving a tapered mandril 19 into the center of said floating roller 18 with a rotating motion. The flange includes a plurality of channels 20 in the hole 16, the annular channels 20 extending from the hole 16 into the flange 12. The floating roller 18 is expanded by insertion of the rotating mandril 19 and serves to expand (cold flow) the exterior surface 21 of the tube 14 into the channels 20 to form a joint between the tube 14 and the flange 12. The flange 12 includes a plurality of bolt holes 22 for attachment to any desired system, e.g., a hydraulic system.

The flange 12 prior to the placing of the tube 14 in the hole 16 is cleaned of all oil, dirt and oxides and then contacted according to the present invention to obtain controlled oxidation thereof with steam at a temperature and for a time sufficient to form a thin adherent hard metal oxide layer on the surface thereof and within the channels 20. Generally, the flange 12 should be heated to above about 100°C prior to said contacting to avoid condensation of water thereupon from said steam. The steam serves as the source of oxygen for the controlled oxidation. The preferred joint is made of an iron based alloy and, in that case, the contacting is carried out in a substantially oxygen gas free atmosphere at a temperature above about 340°C for at least about 5 minutes. Preferably the contacting is at a temperature which falls within the range from about 340°C to about 650°C for a time of at least about half an hour. More preferably, with an iron based alloy, the contacting is carried out at a temperature which falls within the range from about 540°C to about 600°C for from about one hour to about two hours. Under the above conditions, a thin hard iron oxide layer, more particularly, $Fe_3O_4$, perhaps with a small amount of FeO also present forms on the surface of the hole 16, in the channels 20 and generally on the flange 12. The oxidation must be controlled to be sufficiently mild so that rust ($Fe_2O_3$) is not formed.

After completion of the contacting with steam, the flange 12 is cooled, generally still in a substantially oxygen gas free atmosphere, at least until the temperature of the flange has dropped to no more than about 370°C. Thereafter cooling can be carried out in air if so desired. For the full effect of the present invention to be realized, it is desirable that the annular channel or channels 20 be extended from the hole 16 into the flange 12 prior to the contacting of the flange with steam whereby the thin hard metal oxide layer is also formed within the channels 20 and whereby later machining of the channels 20 into the hole 16 cannot cause damage to the thin hard metal oxide layer on the surface of the hole 16 or lead to dirt, oil, etc. accumulation thereon which would serve to at least partially negate the effect of the thin hard oxide layer.

The hard metal oxide layer is believed to be harder than the metallic member and, of course, also harder than the yet softer tubing. On a micro-scale, the layer is believed to be somewhat uneven as is the surface of the tubing. Thus, attempts to twistably loosen the tubing from the metallic member are believed to lead to a wedging into the tubing of micro-upstanding portions of the hard oxide layer with a resulting increased resistance to torsionally applied loads. Also, the hard metal oxide layer is intimately bonded to the metallic member whereby the micro-upstanding portions thereof are not easily pulled loose.

It is necessary to the practice of the present invention that the surface of the preferred metal flange be completely clean of lubricant and the like; thus, careful cleaning or more preferably dry machining of the annular channel or channels is necessitated.

Surprisingly, joints of increased torsional strength are obtained by the process of the present invention only if the metallic member which is controllably oxidized by said process is of substantially full theoretical density. Thus, while forged, extruded, cast, etc. a stock of substantially 100% the full density of the alloy, when treated, exhibits markedly increased torsional strength, stock having significantly lower density than the full density of the alloy, e.g., powdered metal which has been compressed into a desired shape and which generally has only about 80% to 95% of theoretical alloy density, when treated, exhibits substantially no change in its (initially higher) torsional strength.

EXAMPLE

This example illustrates the improved torque resistance of joints made in accordance with the present invention. Six flanges (designated flanges 1–6 in the Table below) were machined from SAE 1144 steel barstock. Each of the six flanges had a piece of SAE 1008 mild steel tubing inserted therein and expanded into annular channels in the holes therein, the channels having been machined into each of the six flanges by dry machining techniques. Three of the machined flanges were steam treated by the process of the present invention at a temperature of 570°C for two hours prior to insertion of the tubing therein to controllably oxidize the surface thereof and form a hard iron oxide layer thereon of $Fe_3O_4$. The other three machined flanges were not steam treated. Table 1 lists the results of torque testing of the joints formed between the respective flanges and the steel tubing.

| Flange | Steam Treatment | Torque Required to Break Joint | ASTME 18 Rockwell B Hardness |
|---|---|---|---|
| 1 | No | 612 Nm | 94 |
| 2 | No | 772 | 95 |
| 3 | No | 784 | 95 |
| 4 | Yes | 1224 | 93 |
| 5 | Yes | 1224 | 94 |
| 6 | Yes | 1355 | 94 |

Hardness test run on flanges 1–6, all of which were made from the same piece of barstock, show that no significant difference in Rockwell B hardness occurred as a result of the steam treating.

The results of this test make it clear that treatment of a machined steel flange, prior to the placing of a tube in a hole in the flange, with steam in a substantially oxygen gas free atmosphere at a temperature above about 340°C for at least about 5 minutes to controllably oxidize the surface thereof to form $Fe_3O_4$ thereon and cooling of said flange after completion of said contacting leads to the formation of a joint with said flange having significantly superior properties to a similar joint prepared without said contacting and cooling steps.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a process for forming a tubing-machined metallic member joint comprising providing a metallic member of substantially full theoretical density having a portion thereof adapted to matingly receive a metallic tube, placing one end of said tube against said mating portion of said metallic member, said tube being formulated of a less hard metal than said member, and cold flowing said one end of said tube against said mating portion thereby forming said joint, the improvement of increasing the torque strength of said joint comprising:

controllably oxidizing only said member at an elevated temperature prior to the placing of said tube in mating contact with said mating portion to form a thin adherent hard metal oxide layer on said mating portion; and cooling said member after completion of said oxidizing.

2. An improved process as in claim 1, wherein said metallic member is made of an iron based alloy and said layer comprises $Fe_3O_4$.

3. In a process for forming a tubing-machined metallic member joint comprising providing a metallic member of substantially full theoretical density having a portion thereof adapted to matingly receive a metallic tube, placing one end of said tube against said mating portion of said metallic member, said tube being formulated of a less hard metal than said member, and cold flowing said one end of said tube against said mating portion thereby forming said joint, the improvement of increasing the torque strength of said joint comprising:

contacting only said member, prior to the placing of said tube in mating contact with said mating portion with steam at a temperature and for a time sufficient to form a thin hard metal oxide layer on said mating portion; and cooling said member after completion of said contacting.

4. An improved process as in claim 3, wherein said member is made of an iron based alloy and said contacting is in a substantially oxygen gas free atmosphere at a temperature above about 340°C for a time of at least about 5 minutes.

5. An improved process as in claim 4, wherein said contacting is carried out at a temperature which falls within the range fron about 340°C to about 650°C for at least about one half hour.

6. An improved process as in claim 5, wherein said temperature falls within the range from about 540°C to about 600°C and said time falls within the range from about one hour to about two hours.

7. An improved process as in claim 6, wherein said member comprises a flange, said mating portion comprises a circular cross section hole through said flange, said hole includes at least one annular channel extending therefrom into said flange, said tube has an external diameter substantially equal to the diameter of said hole, and said cold flowing comprises forcing an expanding means into said one end of said tube with said tube in said hole to force said tube to cold flow into said annular channel and thereby form said joint.

8. An improved process as in claim 7, wherein said annular channel is dry machined into said flange prior to said contacting step.

9. A tubing-machined metal joint formulated by providing a metallic member of substantially full theoretical density having a portion thereof adapted to matingly receive a metallic tube formulated of a less hard metal than said member, controllably oxidizing only said member at an elevated temperature prior to the placing of said tube in mating contact with said mating portion to form a thin adherent hard metal oxide layer on said mating portion, placing one end of said tube against said mating portion of said metallic member and cold flowing said one end of said tube against said mating portion thereby forming said joint of increased torque strength.

* * * * *